(12) United States Patent
Waseen et al.

(10) Patent No.: US 10,684,030 B2
(45) Date of Patent: Jun. 16, 2020

(54) WIRELESS ACTUATOR SERVICE

(71) Applicant: Honeywell International Inc., Morristown, NJ (US)

(72) Inventors: Daniel Waseen, Minneapolis, MN (US); Sophia Bellos, Morristown, NJ (US); Carl Penttila, Morristown, NJ (US); Timothy McCarthy, Maple Grove, MN (US); Robert Sibilski, Ramsey, MN (US)

(73) Assignee: Honeywell International Inc., Morris Plains, NJ (US)

( * ) Notice: Subject to any disclaimer, the term of this patent is extended or adjusted under 35 U.S.C. 154(b) by 510 days.

(21) Appl. No.: 14/639,923

(22) Filed: Mar. 5, 2015

(65) Prior Publication Data

US 2016/0258638 A1    Sep. 8, 2016

(51) Int. Cl.
*F24F 11/00* (2018.01)
*H04W 4/80* (2018.01)
(Continued)

(52) U.S. Cl.
CPC ........... *F24F 11/0001* (2013.01); *H04W 4/70* (2018.02); *H04W 4/80* (2018.02); *F24F 11/56* (2018.01); *H04W 88/02* (2013.01)

(58) Field of Classification Search
CPC combination set(s) only.
See application file for complete search history.

(56) References Cited

U.S. PATENT DOCUMENTS

| 4,864,519 A | 9/1989 | Appleby et al. |
| 4,916,460 A | 4/1990 | Powell |

(Continued)

FOREIGN PATENT DOCUMENTS

| AU | 660906 | 7/1995 |
| CA | 2125694 | 5/1994 |

(Continued)

OTHER PUBLICATIONS

International Search Report and Written Opinion for Corresponding Application No. PCT/US2016/019459, dated Jul. 6, 2016.
(Continued)

*Primary Examiner* — Zhiyu Lu
(74) *Attorney, Agent, or Firm* — Seager Tufte & Wickhem LLP

(57) ABSTRACT

A wireless actuator assembly for use in a building control system includes an actuated component such as a damper or a valve and an actuator that is configured to move the actuated component between a first position and a second position. The assembly includes a short range wireless communication module having a nominal communication range of less than 60 feet and an actuator controller that is operably coupled to the actuator and the short range wireless communication module. The actuator controller may be configured to receive one or more actuator commands from a portable handheld device via the short range wireless communication module and to send information to the portable handheld device via the short range wireless communication module.

16 Claims, 13 Drawing Sheets

(51) Int. Cl.
*H04W 4/70* (2018.01)
*F24F 11/56* (2018.01)
*H04W 88/02* (2009.01)

(56) References Cited

U.S. PATENT DOCUMENTS

| | | | |
|---|---|---|---|
| 5,039,995 A | 8/1991 | Hulbert | |
| 5,156,203 A | 10/1992 | Funakoshi et al. | |
| 5,178,191 A | 1/1993 | Schaefer | |
| 5,218,356 A | 6/1993 | Knapp | |
| 5,224,648 A | 7/1993 | Simon et al. | |
| 5,316,073 A | 5/1994 | Klaus et al. | |
| 5,355,305 A | 10/1994 | Seem et al. | |
| 5,379,455 A | 1/1995 | Koschek | |
| 5,414,640 A | 5/1995 | Seem | |
| 5,506,768 A | 4/1996 | Seem et al. | |
| 5,550,752 A | 8/1996 | Federspiel | |
| 5,555,195 A | 9/1996 | Jensen et al. | |
| 5,555,196 A | 9/1996 | Asano | |
| 5,568,377 A | 10/1996 | Seem et al. | |
| 5,590,830 A | 1/1997 | Kettler et al. | |
| 5,682,329 A | 10/1997 | Seem et al. | |
| RE35,736 E | 2/1998 | Powell | |
| 5,737,318 A | 4/1998 | Melnik | |
| 5,762,265 A | 6/1998 | Kitamura et al. | |
| 5,769,315 A | 6/1998 | Drees | |
| 5,791,408 A | 8/1998 | Seem | |
| 5,867,384 A | 2/1999 | Drees et al. | |
| 5,960,214 A | 9/1999 | Sharpe, Jr. et al. | |
| 6,006,142 A | 12/1999 | Seem et al. | |
| 6,014,546 A | 1/2000 | Georges et al. | |
| 6,033,302 A | 3/2000 | Ahmed et al. | |
| 6,095,426 A | 8/2000 | Ahmed et al. | |
| 6,122,605 A | 9/2000 | Drees et al. | |
| 6,141,595 A | 10/2000 | Gloudeman et al. | |
| 6,216,266 B1 * | 4/2001 | Eastman | H04N 5/44513 348/570 |
| 6,219,590 B1 | 4/2001 | Bernaden, III et al. | |
| 6,219,950 B1 | 4/2001 | Hsu | |
| 6,223,544 B1 | 5/2001 | Seem | |
| 6,265,843 B1 | 7/2001 | West et al. | |
| 6,296,193 B1 | 10/2001 | West et al. | |
| 6,353,853 B1 | 3/2002 | Gravlin | |
| 6,369,716 B1 | 4/2002 | Abbas et al. | |
| 6,389,331 B1 | 5/2002 | Jensen et al. | |
| 6,408,228 B1 | 6/2002 | Seem et al. | |
| 6,415,617 B1 | 7/2002 | Seem | |
| 6,437,692 B1 | 8/2002 | Petite et al. | |
| 6,477,439 B1 | 11/2002 | Bernaden, III et al. | |
| 6,480,889 B1 | 11/2002 | Saito et al. | |
| 6,486,778 B2 | 11/2002 | Mahler et al. | |
| 6,594,554 B1 | 7/2003 | Seem et al. | |
| 6,759,956 B2 | 7/2004 | Menard et al. | |
| 6,816,811 B2 | 11/2004 | Seem | |
| 6,826,607 B1 | 11/2004 | Gelvin et al. | |
| 6,829,513 B2 | 12/2004 | Piersanti et al. | |
| 6,842,430 B1 | 1/2005 | Melnik | |
| 6,862,540 B1 | 3/2005 | Welch et al. | |
| 6,874,691 B1 | 4/2005 | Hildebrand et al. | |
| 6,898,542 B2 | 5/2005 | Ott et al. | |
| 6,916,239 B2 | 7/2005 | Siddaramanna et al. | |
| 6,937,909 B2 | 8/2005 | Seem | |
| 6,959,356 B2 | 10/2005 | Packwood et al. | |
| 7,010,294 B1 | 3/2006 | Pyotsia et al. | |
| 7,031,880 B1 | 4/2006 | Seem et al. | |
| 7,053,767 B2 | 5/2006 | Petite et al. | |
| 7,053,770 B2 | 5/2006 | Ratiu et al. | |
| 7,085,623 B2 | 8/2006 | Siegers | |
| 7,089,089 B2 | 8/2006 | Cumming et al. | |
| 7,103,511 B2 | 9/2006 | Petite | |
| 7,124,637 B2 | 10/2006 | Singhal et al. | |
| 7,130,719 B2 | 10/2006 | Ehlers et al. | |
| 7,132,757 B2 | 11/2006 | Stiegerwald et al. | |
| 7,148,803 B2 | 12/2006 | Bandy et al. | |
| 7,170,201 B2 | 1/2007 | Hamel et al. | |
| 7,176,601 B2 | 2/2007 | Tanaka et al. | |
| 7,251,570 B2 | 7/2007 | Hancock | |
| 7,284,372 B2 | 10/2007 | Crow | |
| 7,317,927 B2 | 1/2008 | Staton et al. | |
| 7,321,316 B2 | 1/2008 | Hancock et al. | |
| 7,349,360 B2 | 3/2008 | Gutierrez et al. | |
| 7,378,980 B2 | 5/2008 | McFarland | |
| 7,379,390 B2 | 5/2008 | McFarland | |
| 7,382,271 B2 | 6/2008 | McFarland | |
| 7,388,886 B2 | 6/2008 | Perkins et al. | |
| 7,406,300 B2 | 7/2008 | Pan | |
| 7,426,452 B2 | 9/2008 | Zielinski et al. | |
| 7,433,740 B2 | 10/2008 | Hesse | |
| 7,436,797 B2 | 10/2008 | Shepard et al. | |
| 7,468,661 B2 | 12/2008 | Petite et al. | |
| 7,479,727 B1 | 1/2009 | Grace | |
| 7,496,472 B2 | 2/2009 | Seem | |
| 7,545,267 B2 | 6/2009 | Stortoni | |
| 7,554,941 B2 | 6/2009 | Ratiu et al. | |
| 7,559,529 B2 | 7/2009 | Affaticati et al. | |
| 7,586,888 B2 | 9/2009 | Wang | |
| 7,623,826 B2 | 11/2009 | Pergal | |
| 7,640,007 B2 | 12/2009 | Chen et al. | |
| 7,653,010 B2 | 1/2010 | Ensor | |
| 7,653,394 B2 | 1/2010 | McMillin | |
| 7,660,701 B2 | 2/2010 | Sharpe, Jr. | |
| 7,660,892 B2 | 2/2010 | Choong et al. | |
| 7,728,715 B2 | 6/2010 | Riedel et al. | |
| 7,729,882 B2 | 6/2010 | Seem | |
| 7,752,309 B2 | 7/2010 | Keyghobad et al. | |
| 7,799,560 B2 | 9/2010 | Wilson et al. | |
| 7,827,813 B2 | 11/2010 | Seem | |
| 7,869,805 B2 | 1/2011 | Schnaare et al. | |
| 7,898,147 B2 | 3/2011 | Grabinger et al. | |
| 7,908,126 B2 | 3/2011 | Bahel et al. | |
| 7,970,350 B2 | 6/2011 | Sheynman et al. | |
| 8,005,514 B2 | 8/2011 | Saito et al. | |
| 8,027,742 B2 | 9/2011 | Seem et al. | |
| 8,036,594 B2 | 10/2011 | Schadler | |
| 8,049,361 B2 | 11/2011 | Kielb et al. | |
| 8,281,174 B2 | 10/2012 | Seiler | |
| 8,370,483 B2 | 2/2013 | Choong et al. | |
| 8,503,330 B1 * | 8/2013 | Choong | H04W 24/02 370/254 |
| 8,725,081 B2 | 5/2014 | Kantzes et al. | |
| 8,929,948 B2 | 1/2015 | Vanderaa et al. | |
| 9,008,804 B2 | 4/2015 | Junk et al. | |
| 9,024,717 B2 | 5/2015 | Songkakul et al. | |
| 9,141,105 B2 | 9/2015 | Trepina et al. | |
| 9,395,099 B2 | 7/2016 | Edwards et al. | |
| 2002/0152298 A1 | 10/2002 | Kikta et al. | |
| 2003/0101009 A1 | 5/2003 | Seem et al. | |
| 2003/0151513 A1 | 8/2003 | Herrmann et al. | |
| 2003/0160693 A1 | 8/2003 | Hisano | |
| 2003/0216837 A1 | 11/2003 | Reich et al. | |
| 2004/0235468 A1 | 11/2004 | Luebke et al. | |
| 2004/0236547 A1 * | 11/2004 | Rappaport | G06F 17/509 703/2 |
| 2005/0060434 A1 * | 3/2005 | Fazal | H04L 41/12 709/247 |
| 2005/0113943 A1 | 5/2005 | Nian | |
| 2005/0228509 A1 | 10/2005 | James | |
| 2005/0285716 A1 | 12/2005 | Denison et al. | |
| 2006/0007945 A1 | 1/2006 | Schoettle et al. | |
| 2006/0028997 A1 * | 2/2006 | McFarland | H04L 12/2803 370/252 |
| 2006/0063522 A1 | 3/2006 | McFarland | |
| 2006/0063523 A1 | 3/2006 | McFarland | |
| 2006/0104197 A1 | 5/2006 | Proctor et al. | |
| 2006/0193262 A1 | 8/2006 | McSheffrey | |
| 2006/0220988 A1 * | 10/2006 | Hillis | G09G 3/001 345/30 |
| 2007/0097993 A1 | 5/2007 | Bojahra | |
| 2007/0191075 A1 | 8/2007 | Greene et al. | |
| 2007/0210932 A1 * | 9/2007 | Koshiba | G08C 17/02 340/12.22 |
| 2007/0229298 A1 * | 10/2007 | Frederick | E21F 11/00 340/13.25 |

(56) References Cited

U.S. PATENT DOCUMENTS

| | | | | |
|---|---|---|---|---|
| 2007/0232288 | A1* | 10/2007 | McFarland | H04L 43/00 455/423 |
| 2008/0064387 | A1* | 3/2008 | Koncelik | H04W 8/245 455/425 |
| 2008/0137589 | A1* | 6/2008 | Barrett | H04M 3/42348 370/327 |
| 2008/0179408 | A1 | 7/2008 | Seem | |
| 2008/0242278 | A1* | 10/2008 | Rekimoto | H04L 63/0407 455/414.2 |
| 2008/0277486 | A1 | 11/2008 | Seem et al. | |
| 2008/0290986 | A1 | 11/2008 | Laughlin-Parker et al. | |
| 2009/0033513 | A1* | 2/2009 | Salsbury | H04W 24/00 340/4.2 |
| 2009/0043666 | A1* | 2/2009 | Malik | G06Q 10/087 705/26.8 |
| 2009/0045939 | A1 | 2/2009 | Holland et al. | |
| 2009/0065596 | A1 | 3/2009 | Seem et al. | |
| 2009/0265583 | A1 | 10/2009 | Bouse et al. | |
| 2009/0307255 | A1* | 12/2009 | Park | G06Q 10/10 |
| 2013/0035077 | A1* | 2/2013 | Tsai | H04L 12/2818 455/414.1 |
| 2013/0339383 | A1* | 12/2013 | Song | G06F 16/9537 707/769 |
| 2014/0062297 | A1* | 3/2014 | Bora | H05B 33/0863 315/34 |
| 2014/0151456 | A1 | 6/2014 | McCurnin et al. | |
| 2014/0179234 | A1* | 6/2014 | Lee | H04W 8/005 455/41.2 |
| 2014/0180581 | A1* | 6/2014 | Berlin | G06F 17/40 701/491 |
| 2014/0197294 | A1 | 7/2014 | Kljajic | |
| 2014/0207280 | A1* | 7/2014 | Duffley | G05D 1/0016 700/257 |
| 2014/0207774 | A1* | 7/2014 | Walter | G06F 16/9577 707/736 |
| 2015/0019033 | A1* | 1/2015 | Schroderus | H04L 67/125 700/286 |
| 2015/0081568 | A1* | 3/2015 | Land, III | G06Q 30/016 705/304 |
| 2015/0189726 | A1* | 7/2015 | Spira | H05B 45/10 315/302 |
| 2015/0227870 | A1* | 8/2015 | Noboa | G06Q 10/0635 705/7.28 |
| 2016/0261465 | A1* | 9/2016 | Gupta | H04L 41/14 |
| 2017/0026779 | A1* | 1/2017 | Schmidlin | H04W 4/005 |

FOREIGN PATENT DOCUMENTS

| | | |
|---|---|---|
| CN | 1291704 | 4/2001 |
| CN | 1804744 | 7/2006 |
| CN | 2833675 | 11/2006 |
| CN | 1969239 | 5/2007 |
| CN | 101112077 | 1/2008 |
| CN | 101299299 | 11/2008 |
| CN | 104240321 A | 12/2014 |
| DE | 69311314 | 10/1997 |
| DE | 19832579 | 3/1999 |
| DE | 10038233 | 2/2001 |
| DE | 69808393 | 6/2003 |
| DE | 102004032050 | 3/2005 |
| EP | 0628181 | 6/1997 |
| EP | 1072847 | 1/2001 |
| EP | 0892330 | 10/2002 |
| EP | 0957418 | 1/2003 |
| EP | 1300771 | 4/2003 |
| EP | 1309062 | 5/2003 |
| EP | 2547044 A2 | 1/2013 |
| EP | 2824890 A1 | 1/2015 |
| JP | 2001050599 | 2/2001 |
| JP | 2001082786 | 3/2001 |
| JP | 3242881 | 12/2001 |
| JP | 3358661 | 12/2002 |
| JP | 3370673 | 1/2003 |
| JP | 2003162324 | 6/2003 |
| JP | 2003242212 | 8/2003 |
| JP | 2005044349 | 2/2005 |
| SU | 535103 | 11/1976 |
| WO | WO 95/30114 | 11/1995 |
| WO | WO 00/68744 | 11/2000 |
| WO | WO 03/023536 | 3/2003 |
| WO | WO 2006/053211 | 5/2006 |
| WO | WO 2008/127580 | 10/2008 |
| WO | WO 2009/012269 | 1/2009 |
| WO | WO 2009/012282 | 1/2009 |
| WO | WO 2009/018215 | 2/2009 |
| WO | 2014137533 A2 | 9/2014 |

OTHER PUBLICATIONS

American Society of Heating, Refrigerating and Air-Conditioning Engineers, Inc., "ASHRAE Addenda a,b,c,d, and g to ANSI/ASHRAE Standard 62,1—2004," 28 pages, 2006.
Bristol "On a New Measure of Interaction for Multivariable Process Control," IEEE Transactions on Automatic Control, vol. AC-11, No. 1, pp. 133-134, Jan. 1966.
Castellanos, "Nest Competitor Zstat Launches Crowdfunding for Wireless Thermostat," downloaded from http://www.bizjournals.com/boston/blog/startups/2014/01/nest-comp . . . , 2 pages, printed Sep. 12, 2014.
Castelvecchi, "Wireless Energy May Power Electronics," MIT TechTalk, vol. 51, No. 9, 8 pages, Nov. 15, 2006.
Churchill et al., "Strain Energy Harvesting for Wireless Sensor Networks," Proceedings of SPIE, vol. 5055, pp. 319-327, 2003.
Fountain et al., "Comfort Control for Short-Term Occupancy," Energy and Buildings, vol. 21, pp. 1-13, 1994.
Hosni et al., "Experimental Results for Heat Gain and Radiant/Convective Split from Equipment in Buildings," ASHRAE Transactions 1999, vol. 5, Part 2, 13 pages, 1999.
Karalis et al., "Wireless Non-Radiative Energy Transfer," 17 pages, prior to Mar. 4, 2015.
Katz, "Residential Piezoelectric Energy Sources," del, 7 pages, Jul. 21, 2004.
Kaushal et al., "Environmental Control Including Ventilation in Hospitals," JK Science, Hospital Notes, vol. 6, No. 4, pp. 229-232, Oct.-Dec. 2004.
Lawrence et al., "Adaptive Thermostat With Bluetooth Technology," ECE4007L02, Group 7, Georgia Institute of Technology, 15 pages, downloaded Apr. 27, 2015.
Lowton et al., "Finding NEMO: On the Accuracy of Inferring Location in IEEE 802.15.4 Networks," ACM, 5 pages, 2006.
Minkel, "Wireless Energy Transfer May Power Devices at a Distance," downloaded from http://www.scientificamerican.com/article/wireless-energy-transfer/, 3 pages, Nov. 14, 2006.
Ramachandran, "Establishing a Regulatory Framework for Distributed Antenna Systems," Thesis Submitted to University of Colorado, 76 pages, 2008.
Rice et al., "An Evaluation of Hospital Special-Ventilation-Room Pressures," Infection Control and Hospital Epidemiology, vol. 22, No. 1, pp. 19-23, Jan. 2001.
Thomas et al., "Feed-Forward in Temperature Control of Buildings," Energy and Buildings, vol. 37, pp. 755-761, 2005.
Extended European Search Report, EP16759284, 9 pp., dated Sep. 13, 2018.
EP16759284.9 Office Action, pp. 8, dated May 20, 2019.

* cited by examiner

WIRELESS ACTUATOR SERVICE

TECHNICAL FIELD

The disclosure relates generally to building systems that include actuators and more particularly to using portable handheld devices to locate and communicate with actuators that may be hidden from sight.

BACKGROUND

A variety of building systems such as HVAC systems and fire/smoke control systems include dampers that may be opened and closed to control the flow of air. Some building systems include valves that may be opened and closed to control the flow of other fluids such as water. These dampers and valves include actuators that may be configured to drive the damper or valve to a desired open, closed or partially closed position in response to a received control signal. Because these systems are often hidden behind walls and ceilings, it can be time consuming to manually locate an actuator that is not working correctly. For example, it may be necessary for a technician to repeatedly climb a ladder and remove ceiling tiles to find a particular actuator of an HVAC and/or fire suppression system. This can be a tedious and time consuming process.

SUMMARY

The disclosure pertains to building control systems that are configured to facilitate a technician in locating and communicating with a particular actuator. In one example, the disclosure pertains to a wireless actuator assembly for use in a building control system. The assembly may include an actuated component such as a damper or a valve and an actuator that is configured to move the actuated component between a first position and a second position. The assembly may include a short range wireless communication module having a nominal communication range of less than for example 60 feet, and an actuator controller that is operably coupled to the actuator and the short range wireless communication module. The actuator controller may be configured to receive one or more actuator commands from a portable handheld device carried by a technician or the like via the short range wireless communication module, and to send information to the portable handheld device via the short range wireless communication module.

In some cases, the portable handheld device may identifying a measure related to the location of the wireless actuator assembly relative to the portable handheld device, and may displaying an indicator of the relative location on the display of the portable handheld device. In some cases, the measure related to the location of the wireless actuator assembly relative to the portable handheld device may include a signal strength indicator that indicates the signal strength of the short range communication signal received at the portable handheld device. In some cases, the portable handheld device may send an instruction to the wireless actuator assembly via the short range wireless communication module instructing the wireless actuator assembly to emit an audible sound to provide an audible indication to the technician of the relative location of the wireless actuator assembly. These are just some examples.

The preceding summary is provided to facilitate an understanding of some of the features of the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following description of various illustrative embodiments of the disclosure in connection with the accompanying drawings, in which.

Figure 1:
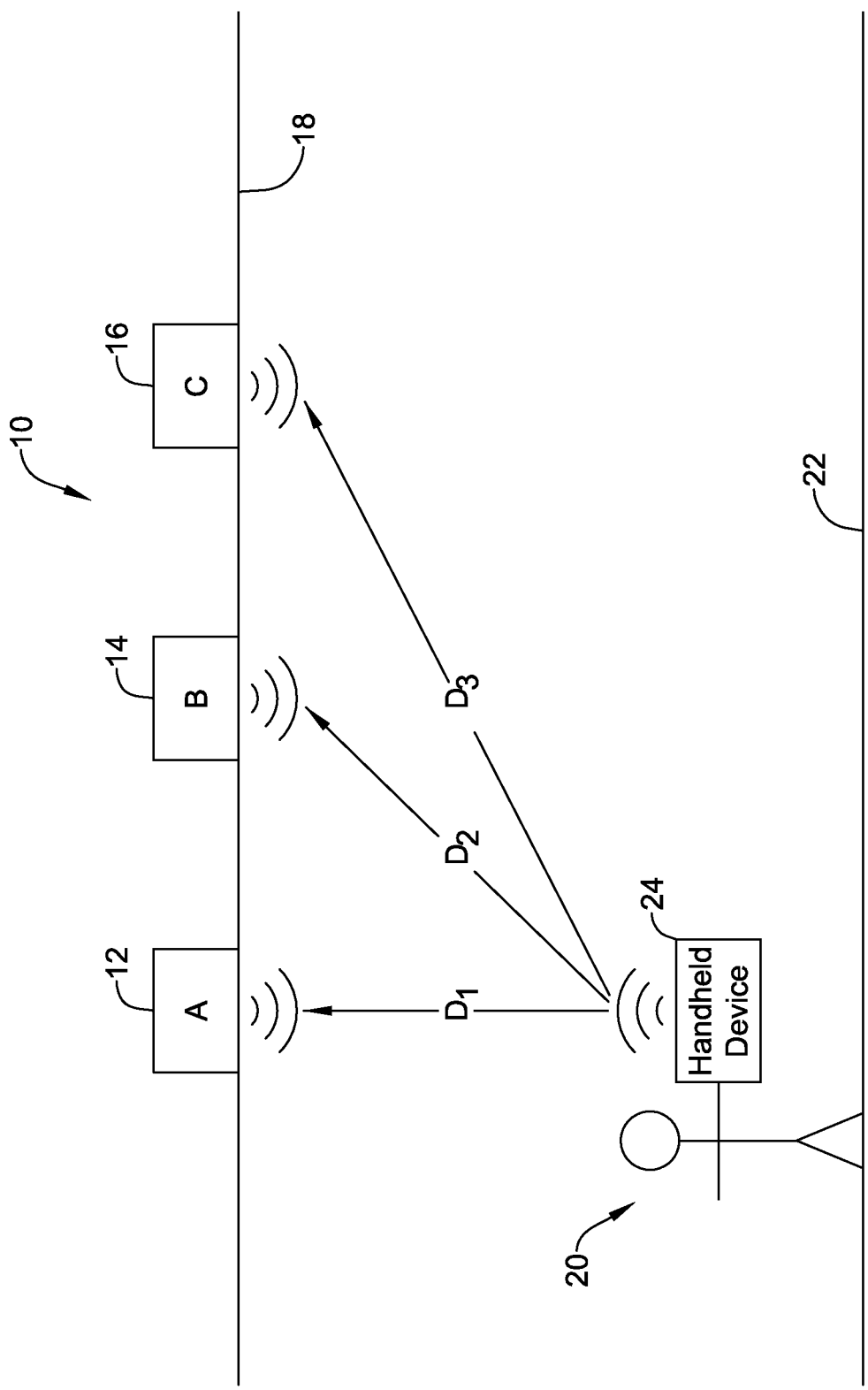
FIG. 1 is a schematic diagram of a portion of a building control system, including a technician with a portable handheld device, in accordance with an illustrative embodiment of the disclosure.

While the disclosure is amenable to various modifications and alternative forms, specifics thereof have been shown by way of example in the drawings and will be described in detail. It should be understood, however, that the intention is not to limit the disclosure to the particular illustrative embodiments described herein. On the contrary, the intention is to cover all modifications, equivalents, and alternatives falling within the spirit and scope of the disclosure.

DESCRIPTION

The following description should be read with reference to the drawings wherein like reference numerals indicate like elements throughout the several views. The description and drawings show several examples that are meant to be illustrative of the claimed disclosure.

FIG. 1 is a schematic diagram of a portion of a building control system 10. The building control system 10 may be part of an HVAC system, a fire or smoke control system, a lighting control system, a security system, and/or any other suitable building control system. The building control system 10 may include a plurality of actuator assemblies, many of which may be behind walls, above ceilings, and generally out of sight. In many cases, the actuator assemblies may be in locations that are difficult to physically reach. For illustration purposes, FIG. 1 shows the building control system 10 that includes an actuator assembly 12 labeled "A", an actuator assembly 14 labeled "B" and an actuator assembly 16 labeled "C", although in some cases the building control system 10 may include less or more than three actuator assemblies. Although not limiting, in one example the actuator assemblies 12, 14 and 16 may be Variable Air Volume (VAV) damper actuators that control the conditioned air delivered to a zone of the building and/or control the return air removed from the zone. As illustrated, the actuator assemblies 12, 14, 16 are shown hidden behind a ceiling 18, although it will be appreciated that the actuator assemblies 12, 14, 16 may instead be hidden behind a wall or other physical structure.

An individual such as a technician 20 may be seen standing on a floor 22 of the building. It will be appreciated that reference to a ceiling 18 and a floor 22 are illustrative only and are not intended to be limiting in any manner. The technician 20 may be seen as holding a portable handheld device 24 that the technician 20 may use to locate and communicate with the actuator assemblies 12, 14, 16. In some examples, the portable handheld device 24 is a tablet. In some cases, the portable handheld device 24 is a smartphone, laptop computer, a more specialized computing tool, or any other suitable computing device. In some embodiments, the technician 20 may be attempting to locate a malfunctioning actuator assembly in response, for example, to a report that a particular room or portion of a building is warmer than it should be, or cooler than it should be. In some embodiments, the technician 20 may be looking for a malfunctioning actuator assembly in response to a testing report outlining the results of testing done by a building management system (BMS), not illustrated. In some cases, the technician 20 may simply be looking for a malfunctioning actuator assembly as part of a routine maintenance sweep of the building.

The portable handheld device 24 may be configured for wireless communication over any of a variety of wireless communication protocols, including those with a relatively short nominal range, such as less than 200 feet, less than 100 feet, less than 80 feet, less than 60 feet, less than 30 feet, less than 15 feet, less than 10 feet or less. Illustrative but non-limiting examples of short nominal range wireless communications protocols include one or more short nominal range wireless communication protocols such as Bluetooth, ZigBee, Ultra-Wideband (UWB), Dedicated Short Range Communication (DSRC), Infrared Data Association (IrDA), EnOcean, REDLINK™, Near field Communication (NFC), RFID, and/or any other suitable common or proprietary wireless protocol, as desired. In some embodiments, BLE (Bluetooth Low Energy) may be employed.

Figure 2:
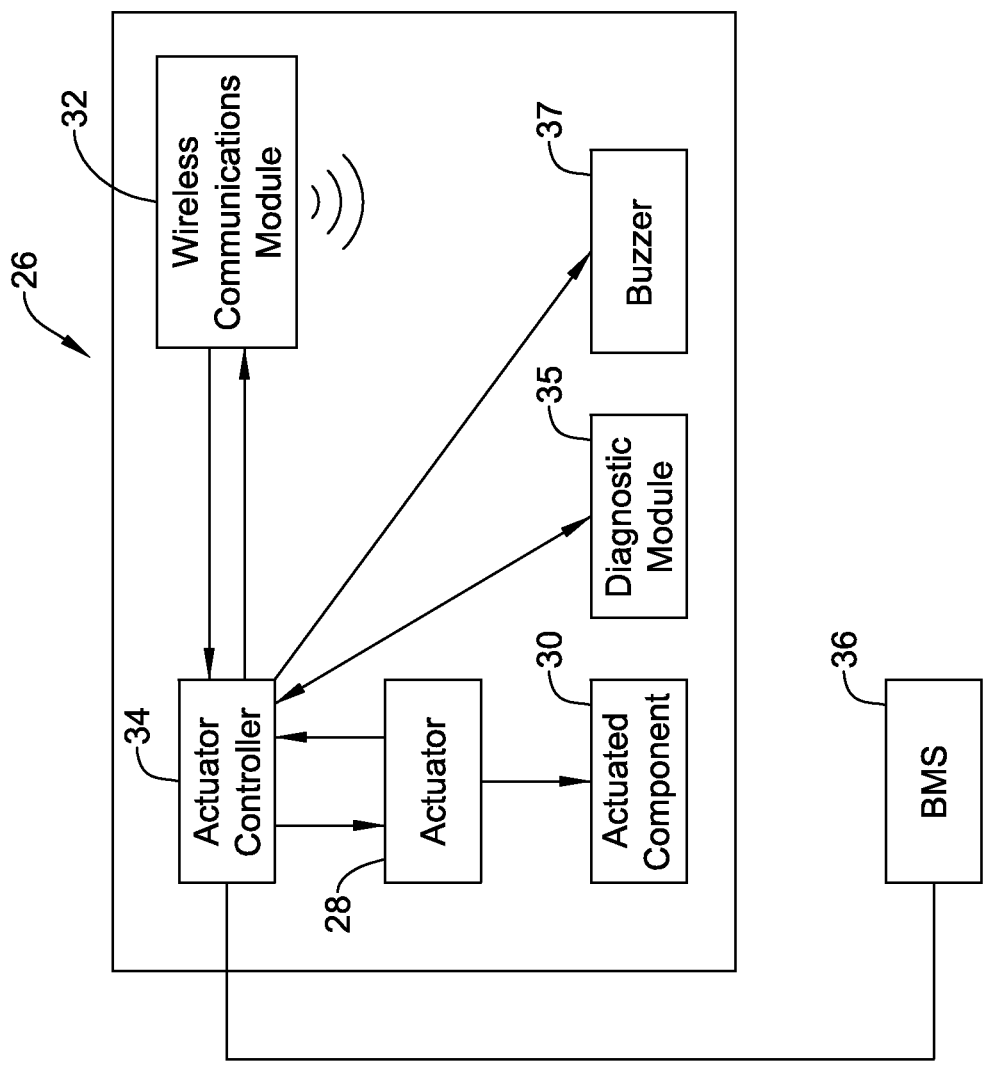
FIG. 2 is a schematic diagram of an illustrative wireless actuator assembly as may be used in the building control system of FIG. 1.

FIG. 2 provides a schematic illustration of an actuator assembly 26 that may represent one of the actuator assemblies 12, 14, 16 of FIG. 1. The illustrative actuator assembly 26 includes an actuator 28 and an actuated component 30. The actuated component 30 may, for example, be an air damper or a water valve, but is not limited to such. The actuator 28 may include an electric motor that can be actuated to move the actuated component 30 between a first position and a second position. The first position and the second position may represent fully open and fully closed positions, for example. In some embodiments, one or both of the first position and the second position may represent partially opened positions. In an HVAC system, for example, the actuator 28 may drive the actuated component 30, an air damper in this case, to a more fully open position in response to a received control signal requesting additional conditioned air to a zone serviced by the air damper.

The illustrative actuator assembly 26 further includes a short range wireless communication module 32 and an actuator controller 34. In some cases, the short range wireless communication module 32 has a nominal communications range of about 60 feet or less, such as a Bluetooth wireless communication module. The illustrative actuator controller 34 is operably coupled to the actuator 28 and to the short range wireless communication module 32. In some embodiments, the actuator controller 34 may be configured to receive one or more actuator commands from the portable handheld device 24 (FIG. 1) via the short range wireless communication module 32 and/or to send information to the portable handheld device 24 via the short range wireless communication module 32.

In some cases, actuator controller 34 may operate autonomously or semi-autonomously. The actuator controller 34 may include a temperature, humidity, air quality and/or other sensor, and the actuator controller 34 may control the actuated component 30 based on, for example, the sensed environmental condition. In some instances, the actuator controller 34 may be operably coupled to a BMS 36 that communicates with the actuator controller 34 to instruct the actuator assembly 26 to open and close the actuated component 30 as appropriate. In some cases, an indication of a possible malfunction, and thus the reason for the technician 20 to be looking for a particular actuator assembly, may come from the BMS 36. For example, the BMS 36 may initiate a diagnostics test that may indicate a malfunctioning actuator assembly. In some cases, the actuator assembly 26 may include a diagnostic module 35 that may perform or aid in performing the diagnostic testing. The diagnostic module 35, when provided, may be separate from the actuator controller 34 as shown, or part of the actuator controller 34.

Figure 3:
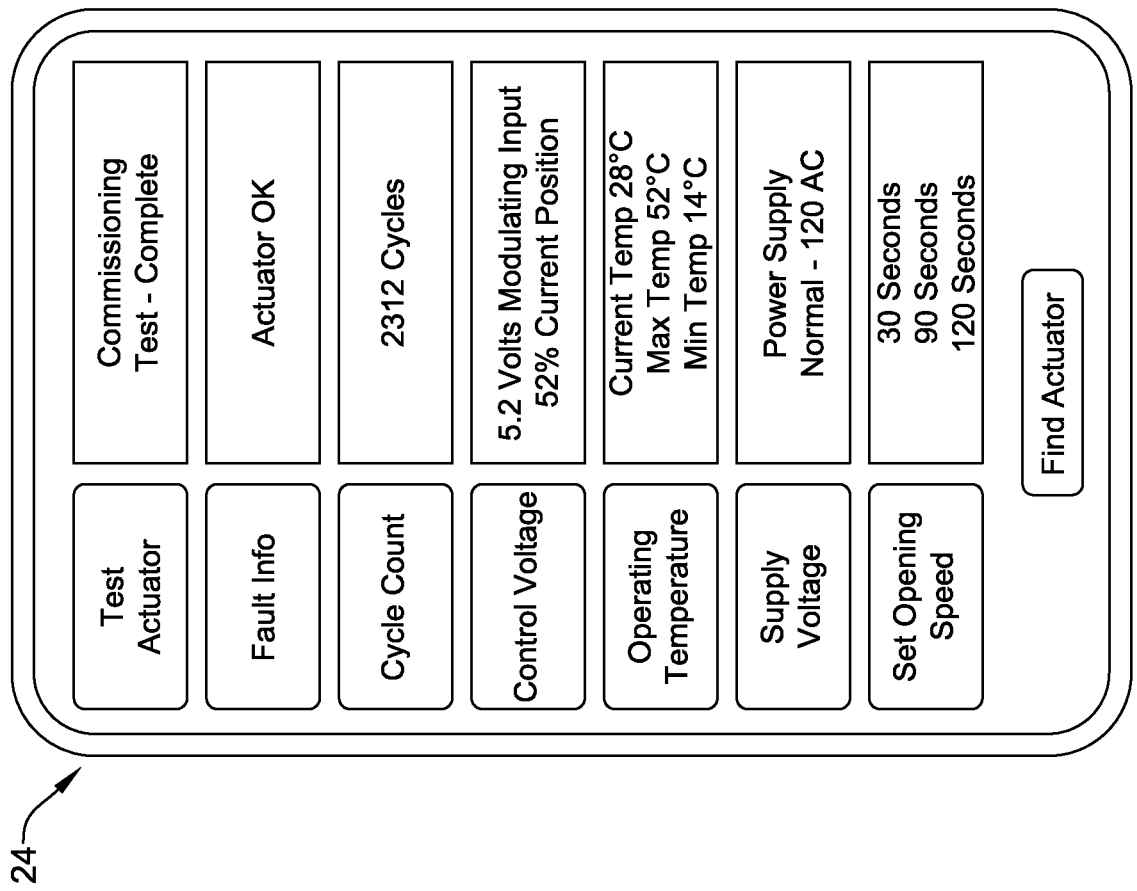
FIG. 3 is a schematic diagram of an illustrative screen of a portable handheld device.

FIG. 3 is a schematic diagram of an illustrative screen of a portable handheld device. In the example shown, a screen of the portable handheld device may display information regarding a selected actuator assembly. The information can by any suitable information such as fault information, if any, the number of open/close cycles that the selected actuator assembly has undergone to date (Cycle Count), the current control voltage, the current, min and max operating temperatures, the current power supply voltage, and/or any other suitable information. In some cases, the screen may allow a technician to select and then set one or more configuration parameters for the selected actuator assembly. In the example shown in FIG. 3, the screen allows a user of the portable handheld device to select an opening speed for the selected actuator assembly. Once selected, the portable handheld device may send the selected opening speed (e.g. 90 seconds) to the selected actuator assembly, and the selected actuator assembly may then use the selected opening speed during subsequent operation. While opening speed is used here as an example, it is contemplated that any suitable parameter or configuration setting may be set in a similar manner.

The example screen of FIG. 3 also includes a "Find Actuator" button. In some instances, such as shown in FIG.

Figure 4:
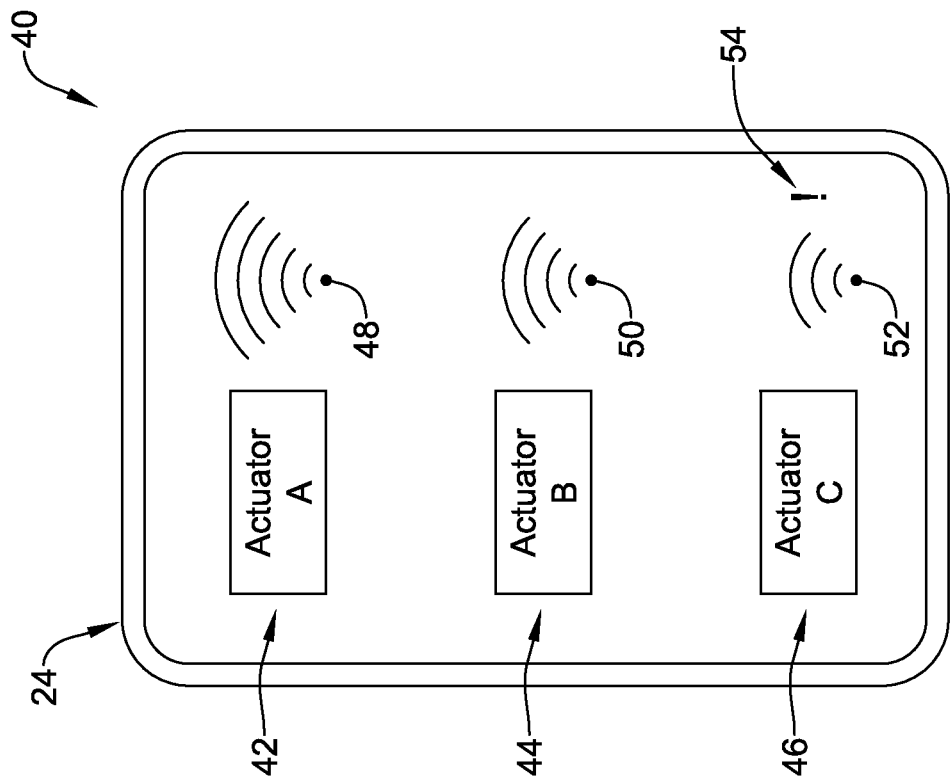
FIG. 4 is a schematic view of an illustrative screen displayable on the illustrative portable handheld device of FIG. 3 with the technician positioned as shown in FIG. 1.

1, there may be a plurality of actuators within a building control system 10. In some cases, the portable handheld device 24 (FIG. 1) may be configured to help locate a particular actuator using one or more wireless signals that are received from one or more short range wireless communication modules 32. In the example screen of FIG. 3, if the technician selects the "Find Actuator" button, the portable handheld device may display a screen 40 such as shown in FIG. 4, which shows a listing of actuator assembly from which a wireless signal is received, and the signal strength of each wireless signal. In some instances, wireless signal strength may be used as an indication of relative distance from the portable handheld device and each of several different actuators (such as actuator assemblies 12, 14, 16). With reference to FIG. 1, it can be seen that with the technician 20 standing in their present location, the actuator assembly 12 is a first distance D1 away from the portable handheld device 24, the actuator assembly 14 is a second distance D2 away from the portable handheld device 24 and the actuator assembly 16 is a third distance D3 away from the portable handheld device 24. As illustrated, D3>D2>D1.

As a result of the varying distances, there may be differences in wireless signal strength. In FIG. 4, the illustrated screen 40 includes a display region 42 that includes information pertaining to an actuator A (actuator assembly 12), a display region 44 that includes information pertaining to an actuator B (actuator assembly 14) and a display region 46 that includes information pertaining to an actuator C (actuator assembly 16). In the example shown, the display region 42 includes a signal strength icon 48, the display region 44 includes a signal strength icon 50 and the display region 46 includes a signal strength icon 52. It can be seen that the signal strength icon 48 is larger than the signal strength icon 50, which is itself larger than the signal strength icon 52. It will be appreciated that these relative differences in signal strength correspond to the varying distances D1, D2 and D3 between the portable handheld device 24 and the corresponding actuator assemblies 12, 14, 16. Also shown in display region 46 is an error icon 54, informing the technician 20 that there is or may be a problem with actuator C (actuator assembly 16). It will be appreciated that any number of different icons may be used to display information. In some cases, the portable handheld device 24 may triangulate to help determine relative locations of the actuators, as desired.

In some embodiments, the technician 20 can utilize the signal strength icons 48, 50, 52 to help locate the actuator C (actuator assembly 16). For example, if the technician 20 moves in a direction that causes the signal strength icon 48 to start becoming smaller, while the signal strength icon 52 starts growing, the technician 20 may be confident that they are moving closer to the desired actuator C. In some instances, to aid in locating a particular actuator assembly, the technician may select a particular actuator (e.g. actuator C), and the portable handheld device 24 may instruct the actuator C (actuator assembly 16), via the short range wireless communication module 32, to emit an audible signal via a buzzer 37 (see FIG. 2), speaker or other noise making device. This audible signal may help the technician identify the location of actuator C. In some instances, the audible signal may be in addition to or in place of the signal strength icons. In some cases, rather than an audible signal, or in addition to an audible signal, a visual signal may be used, such as a blinking LED or the like.

Figure 5:
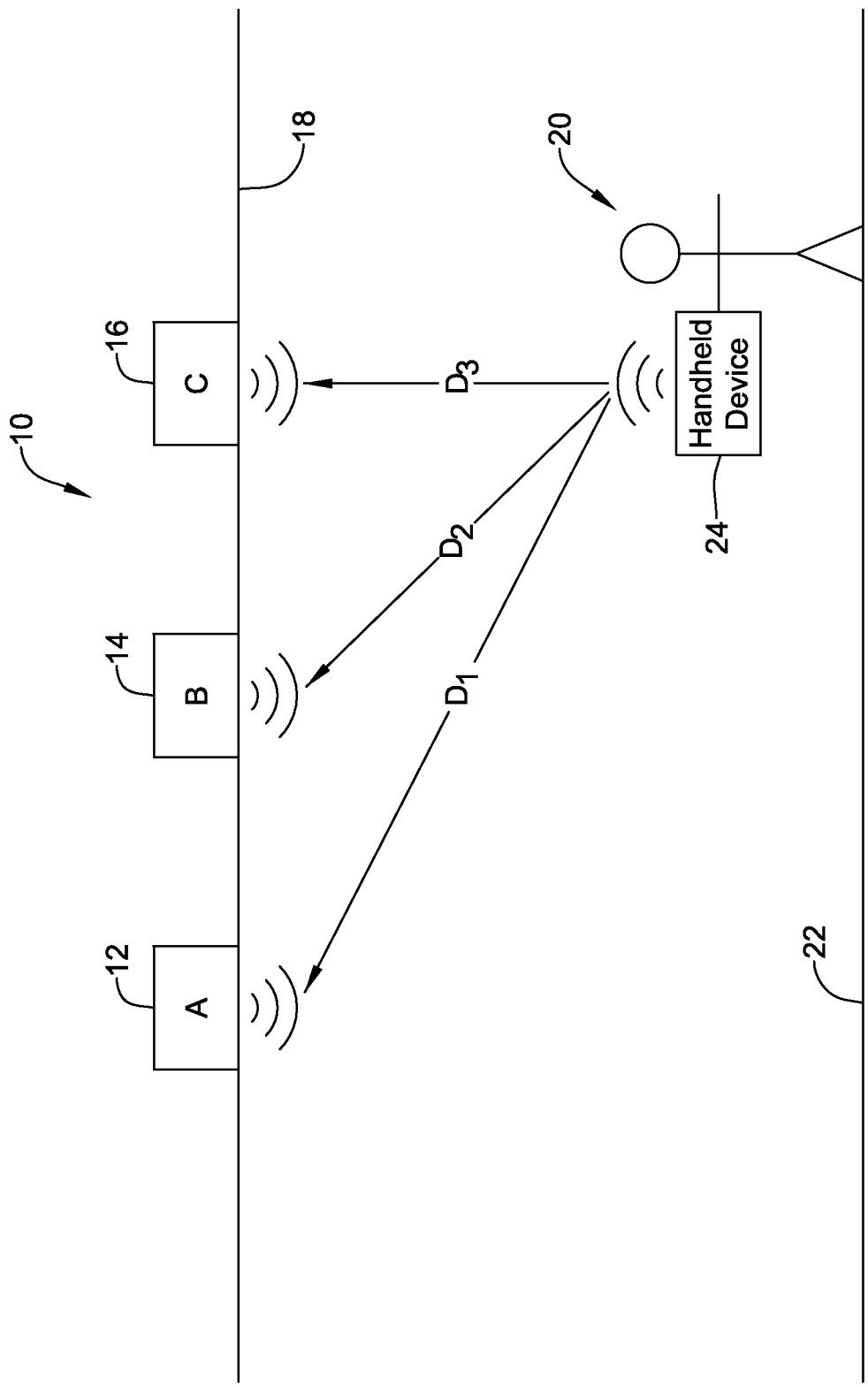
FIG. 5 is a schematic diagram of the portion of a building control system of FIG. 1, showing the technician with a portable handheld device in a new location relative to the actuator assemblies.

It will be appreciated that the signal strength icons 48, 50 and 52 will become smaller and larger, as appropriate, as the technician 20 (and hence the portable handheld device 24) moves around relative to the actuator assemblies 12, 14, 16. In some cases, the signal strength icons 48, 50 and 52 will become smaller and larger in real or near-real time. FIG. 5 illustrates the relative distances D1, D2 and D3 once the technician 20 has minimized their distance to the desired actuator C (actuator assembly 16). It can be seen that now D3 is larger than D2, which is itself larger than D1.

Figure 6:
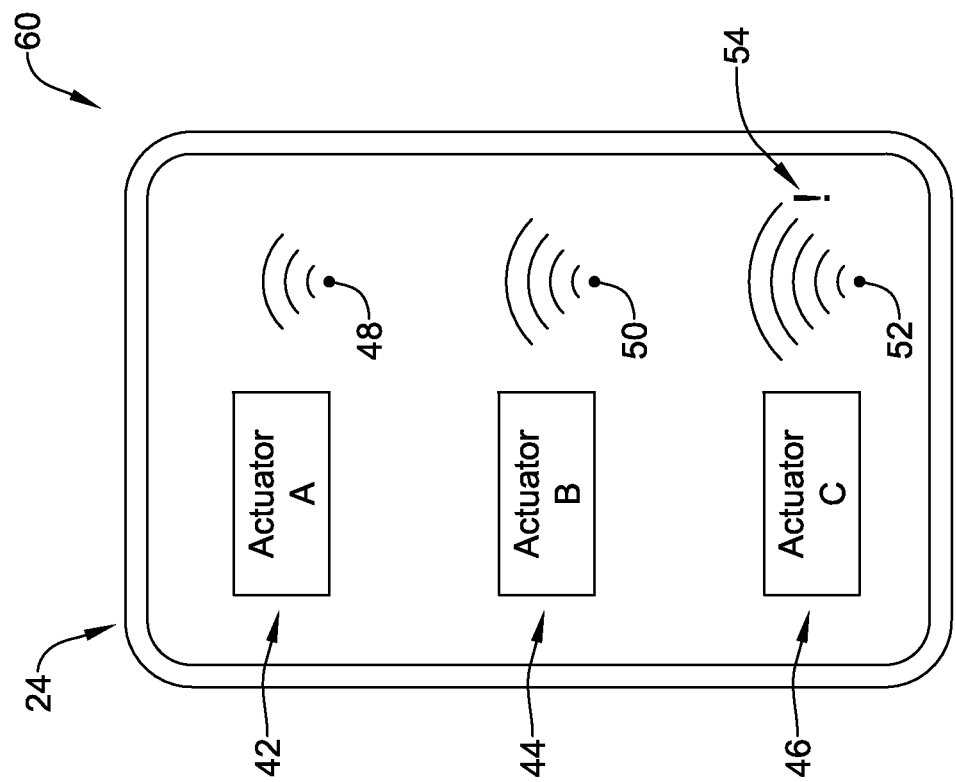
FIG. 6 is a schematic view of an illustrative screen displayable on the illustrative portable handheld device of FIG. 3 with the technician now positioned as shown in FIG. 4.

Correspondingly, FIG. 6 provides a screen 60 that may be displayed on the portable handheld device 24 once the technician 20 has moved closer to the desired actuator C (actuator assembly 16). The illustrated screen 60 includes the display region 42 that includes information pertaining to the actuator A (actuator assembly 12), the display region 44 that includes information pertaining to the actuator B (actuator assembly 14) and the display region 46 that includes information pertaining to the actuator C (actuator assembly 16), as well as the signal strength icons 48, 50 and 52. Now, in contrast to that shown in FIG. 4, the signal strength icon 52 is larger than the signal strength icon 50, which is itself larger than the signal strength icon 48. It will be appreciated that these relative differences in signal strength correspond to the varying distances D1, D2 and D3 between the portable handheld device 24 and the corresponding actuator assemblies 12, 14, 16.

Figure 7A:
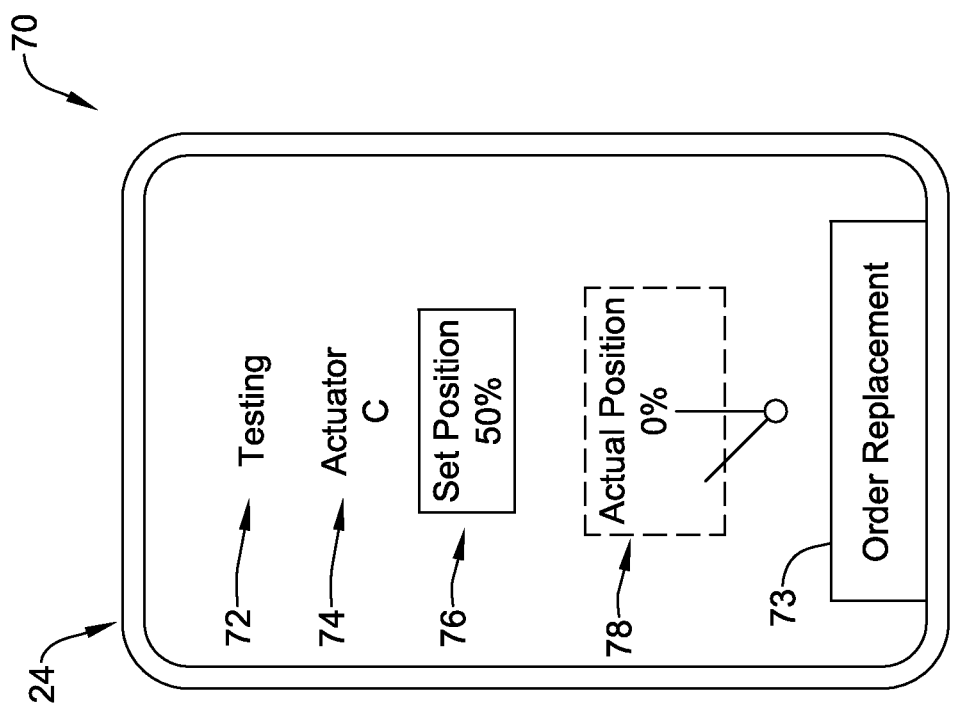
FIG. 7A is a schematic view of an illustrative screen displayable on the portable handheld device, showing an illustrative testing protocol underway.
Figure 7B:
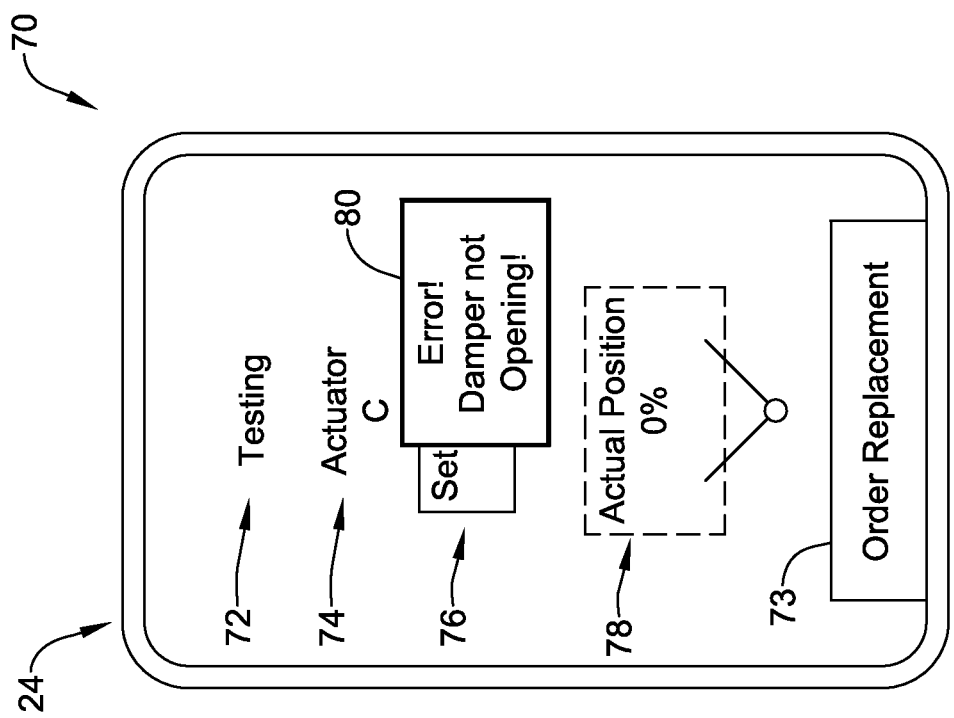
FIG. 7B is a schematic view of an illustrative screen displayable on the portable handheld device, showing an error that resulted from the testing protocol illustrated in FIG. 7A.

Once the desired actuator C (actuator assembly 16) has been located, in some cases the technician 20 may utilize the portable handheld device 24 to test the actuator assembly 16. FIG. 7A provides an example screen 70 that may be displayed on the portable handheld device 24 to test actuator C. The example screen 70 includes an icon 72 indicating that the portable handheld device 24 is initiating a test of the actuator assembly 16, as well as an icon 74 identifying the particular device being tested. As illustrated by an icon 76, the portable handheld device 24 has communicated a command to the actuator assembly 16 instructing the actuator 28 to move the position of the actuated component 30 to a 50 percent position. The portable handheld device 24 then receives from the actuator assembly 16 information pertaining to the actual position of the actuated component 30, as shown as an icon 78. A discrepancy between the commanded position and the actual position may be interpreted as an error. In some instances, and as shown in FIG. 7B, the portable handheld device 24 may display a pop up window 80 that provides additional information.

If a determination is made that a particular actuator needs to be replaced, the actuator assembly may provide the portable handheld device 24, via the short range wireless communication module 32, information pertaining to the appropriate replacement part. This may include, for example, a model number and/or serial number of the replacement part. In some cases, this information may include suggestions regarding preferred suppliers, and may include installation information and/or instructions. In some cases, an "Order Replacement" button 73 may be provided, that when selected, may automatically send an order to a suitable supplier to order and ship the appropriate replacement part. A replacement part or parts may be obtained and then installed.

Figure 8:
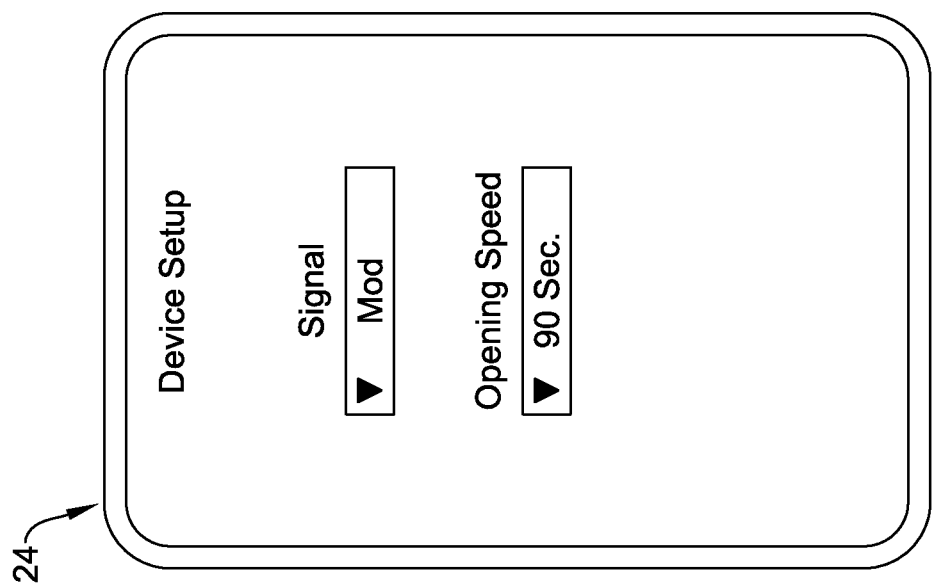
FIG. 8 is a schematic view of an illustrative screen displayable on the portable handheld device, showing an illustrative configuration and/or setup screen for configuring and/or setting up an illustrative wireless actuator assembly.

In some cases, the portable handheld device 24 may aid with installing new and/or replacement parts. FIG. 8 shows an illustrative configuration and/or setup screen for configuring and/or setting up a wireless actuator assembly. In the example shown, the illustrative configuration and/or setup screen may be used to select and then set configuration and/or setup parameters for a wireless actuator assembly. The particular configuration and/or setup parameters that are displayed may be communicated to the portable handheld device 24 by the particular wireless actuator assembly. In the example shown in FIG. 8, the technician 20 can select a control signal type, as well as a desired opening speed. These are just example parameters. It is contemplated that the type and number of parameters that can be set may depend on the particular wireless actuator assembly at hand.

In some cases, once a new or a replacement part has been installed, the portable handheld device 24 may be used to test the new or replacement part. Similar to that shown in FIG. 7A, the portable handheld device 24 may be used to send a command to the actuator assembly 26 (representing the illustrative defective actuator assembly 16) to move to a desired position, and the actuator assembly 26 may provide the portable handheld device 24 with information pertaining to the actual position of the actuated component 30 (FIG. 1), for example. Agreement between commanded and actual position indicates a correctly functioning replacement part.

Figure 9:
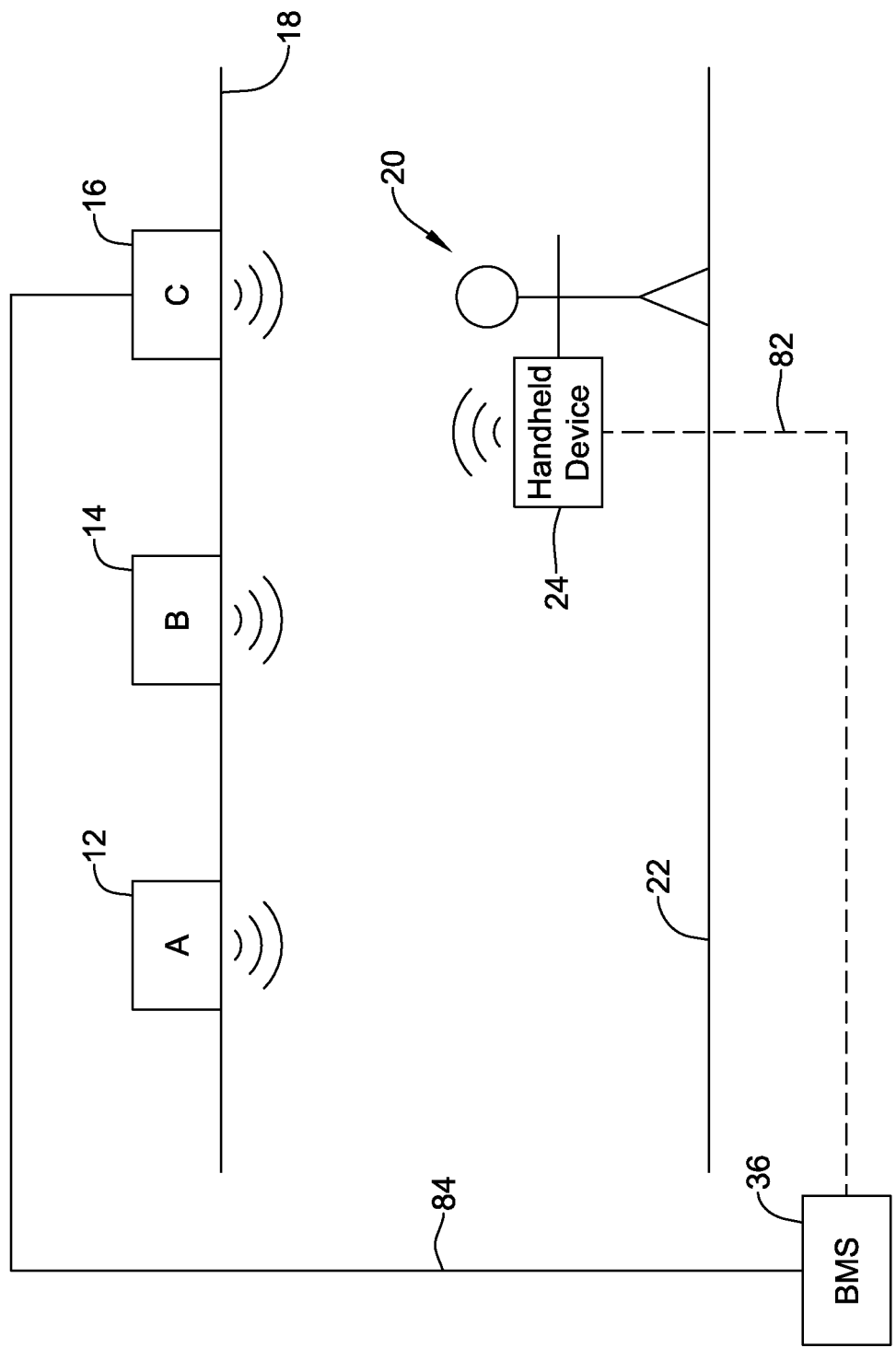
FIG. 9 is a schematic illustration of a portion of a building control system.

In some embodiments, it is desirable to confirm that the replacement part(s) will correctly communicate with a BMS 36. As shown in FIG. 9, the portable handheld device 24 may communicate with the BMS 36 via a communications pathway 82 that may be wired or wireless and instruct the BMS 36 to send one or more commands to the actuator assembly 16 via a communications pathway 84 that may be wired or wireless. In some instances, the communications pathway 84 may be the communications pathway ordinarily used to send commands from the BMS 36 to the actuator assembly 16.

Figure 10:
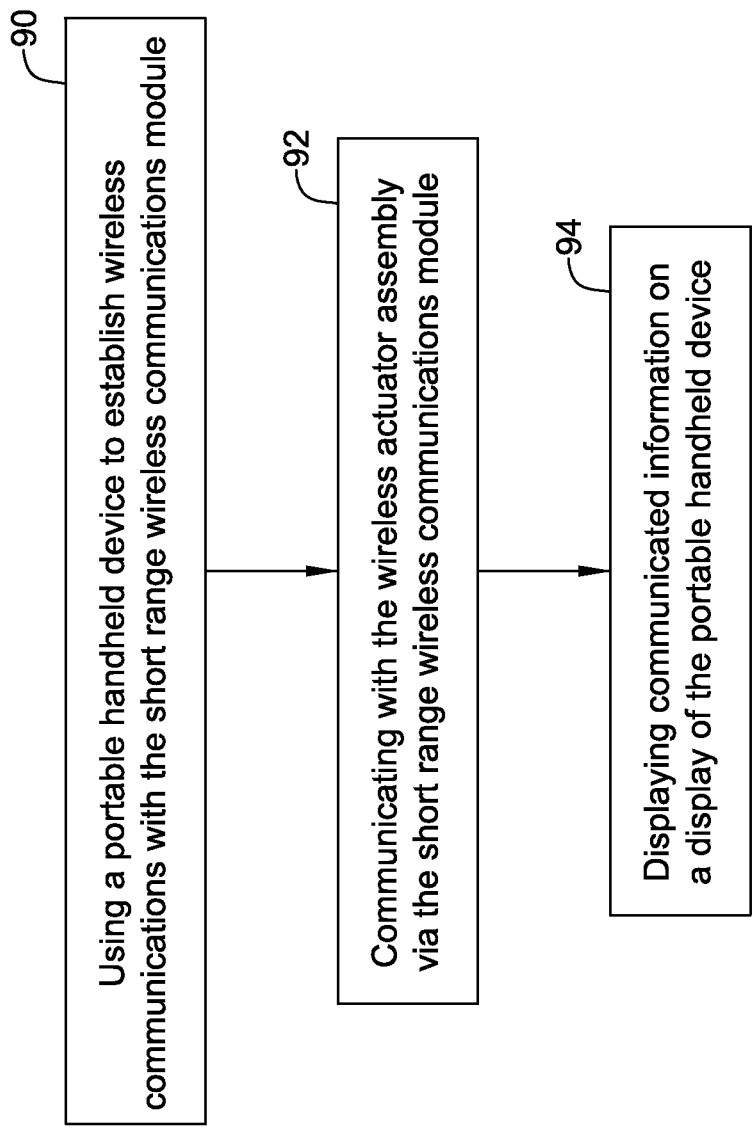
FIG. 10 is a flow diagram showing an illustrative method that may be carried out using the building control system of FIGS. 1 and/or 9.

FIG. 10 provides a flow diagram providing an illustrative method of managing a building automation system that includes a wireless actuator assembly having a short range wireless communication module, such as the actuator assembly 26. In some cases, the building automation system may be an HVAC air handing system, and the wireless actuator assembly may be a wireless damper assembly. A portable handheld device such as the portable handheld device 24 may be used to establish wireless communications with the short range wireless communication module, as generally indicated at block 90.

In some instances, using the portable handheld device to establish communications includes identifying the wireless actuator assembly from a plurality of wireless actuator assemblies. In some cases, using the portable handheld device to establish communications includes identifying a measure relating to the location of the wireless actuator assembly relative to the portable handheld device, and displaying an indicator of the location on a display of the portable handheld device. In some embodiments, the short range wireless communication module may have a range of about 60 feet or less. As noted at block 92, the portable handheld device may communicate with the wireless actuator assembly via the short range wireless communication module. The communicated information may be displayed on a display of the portable handheld device, as generally indicated at block 94.

Figure 11:
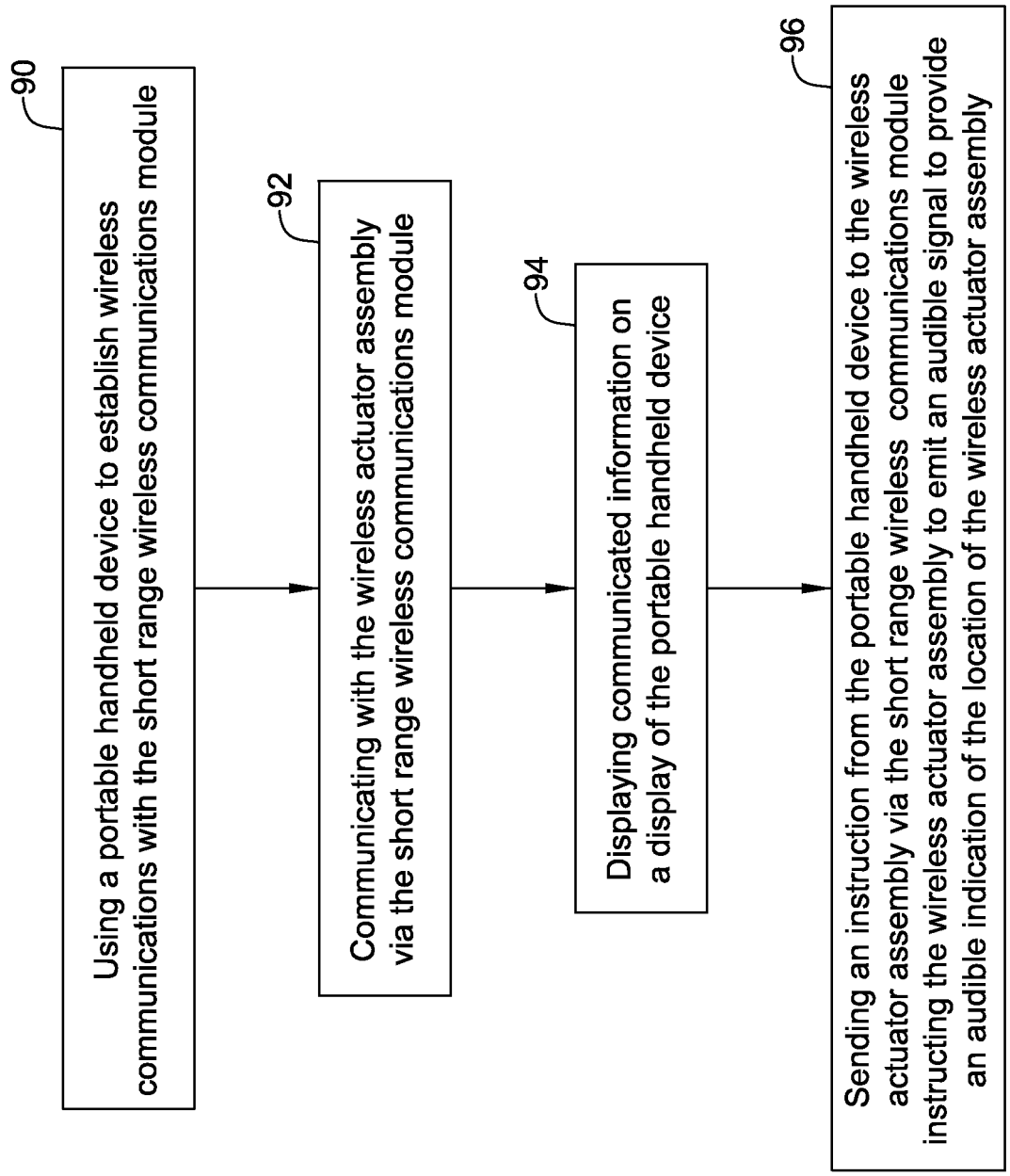
FIG. 11 is a flow diagram showing another illustrative method that may be carried out using the building control systems of FIGS. 1 and/or 9.

FIG. 11 provides a flow diagram providing an illustrative method of managing a building automation system that includes a wireless actuator assembly having a short range wireless communication module, such as the actuator assembly 26. A portable handheld device such as the portable handheld device 24 may be used to establish wireless communications with the short range wireless communication module, as generally indicated at block 90. As noted at block 92, the portable handheld device may communicate with the wireless actuator assembly via the short range wireless communication module. The communicated information may be displayed on a display of the portable handheld device, as generally indicated at block 94. In some embodiments, as illustrated at block 96, the portable handheld device may send an instruction to the wireless actuator assembly via the short range wireless communication module instructing the wireless actuator assembly to emit an audible signal to provide an audible indication of the location of the wireless actuator assembly.

Figure 12:
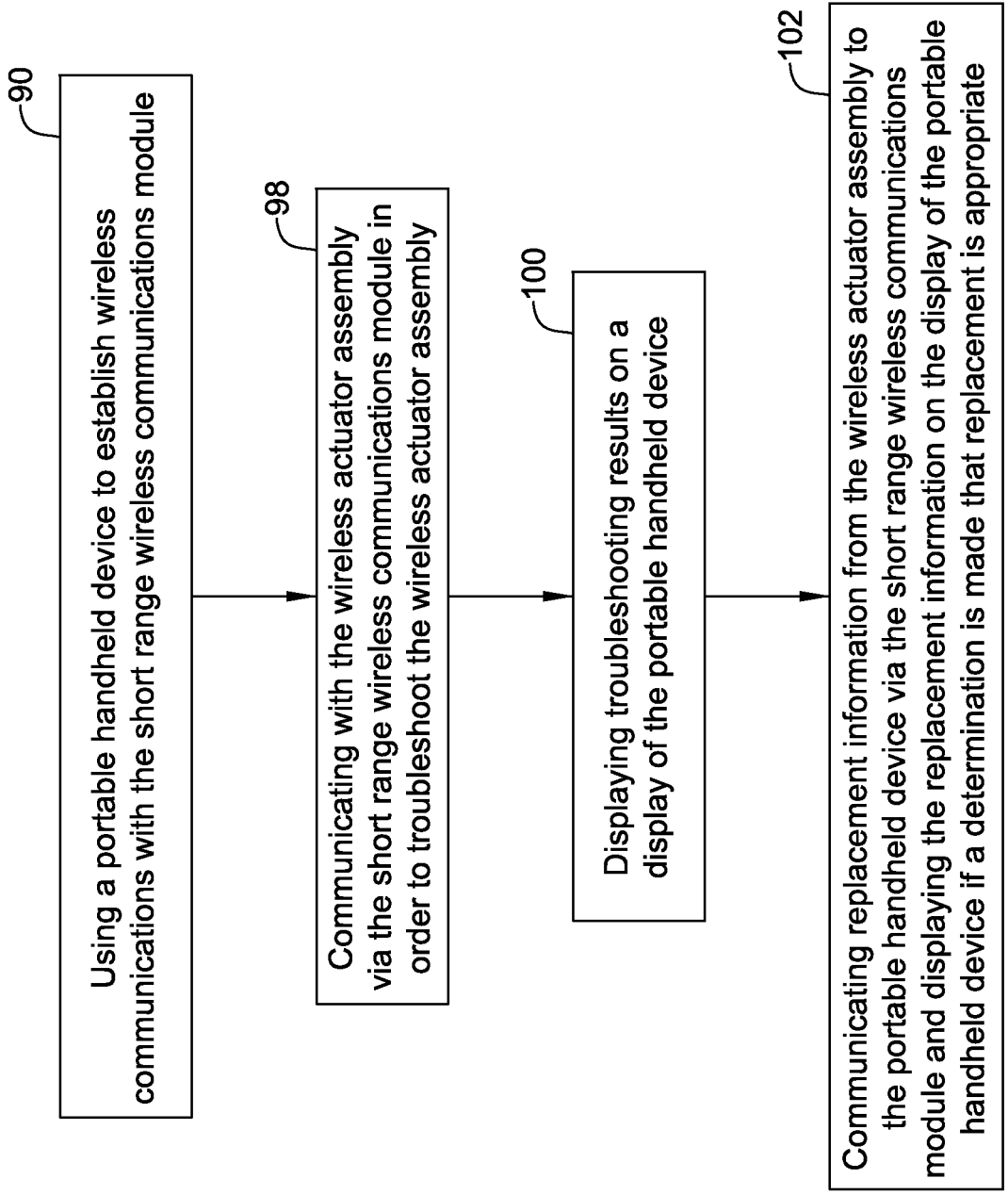
FIG. 12 is a flow diagram showing yet another illustrative method that may be carried out using the building control systems of FIGS. 1 and/or 9.

FIG. 12 provides a flow diagram providing an illustrative method of managing a building automation system that includes a wireless actuator assembly having a short range wireless communication module, such as the actuator assembly 26. A portable handheld device such as the portable handheld device 24 may be used to establish wireless communications with the short range wireless communication module, as generally indicated at block 90. The portable handheld device may communicate with the wireless actuator assembly via the short range wireless communication module in order to trouble-shoot the wireless actuator assembly, as generally shown at block 98. The trouble-shooting results may be displayed on a display of the portable handheld device, as generally indicated at block 100. In some cases, and as indicated at block 102, replacement information may be communicated from the wireless actuator assembly to the portable handheld device via the short range wireless communication module and displayed on the display of the portable handheld device if a determination is made that replacement is appropriate.

The disclosure should not be considered limited to the particular examples described above. Various modifications, equivalent processes, as well as numerous structures to which the disclosure can be applicable will be readily apparent to those of skill in the art upon review of the instant specification.

What is claimed is:

1. A system, comprising:
   a portable handheld device;
   a plurality of wireless actuator assemblies, each of the plurality of wireless actuator assemblies including:
      an actuated component;
      an actuator configured to move the actuated component between a first position and a second position;
      a short range wireless communication module having a nominal communication range of less than 60 feet; and
      an actuator controller operably coupled to the actuator and the short range wireless communication module, the actuator controller configured to receive one or more actuator commands from the portable handheld device via the short range wireless communication module and to send information to the portable handheld device via the short range wireless communication module;
   wherein the portable handheld device is configured to determine an indication of a location of a particular wireless actuator assembly out of the plurality of wireless actuator assemblies relative to a location of the portable handheld device so that a user of the portable handheld device can identify and then test and/or troubleshoot the particular wireless actuator assembly, the particular wireless actuator assembly installed at a location that is behind a wall, a ceiling or other physical structure and hidden from view of the user of the portable handheld device, the portable handheld device determining the relative location of the particular wireless actuator assembly using a signal strength of one or more wireless signals received from the short range wireless communication module of the particular wireless actuator assembly; and wherein the portable handheld device is configured to display a measure of the signal strength on a display of the portable handheld device to provide the indication of the location of the particular wireless actuator assembly relative to the location of the portable handheld device.

2. The system of claim 1, wherein the actuator controller of the particular wireless actuator assembly is configured to receive one or more test and/or troubleshooting commands from the portable handheld device via the short range wireless communication module of the particular wireless actuator assembly and to execute the one or more test and/or troubleshooting commands.

3. The system of claim 2, wherein the one or more test and/or troubleshooting commands, when executed, tests a functionality of the actuator of the particular wireless actuator assembly.

4. The system of claim 1, wherein the actuated component of the particular wireless actuator assembly includes a damper.

5. The system of claim 1, wherein the actuated component of the particular wireless actuator assembly includes a valve.

6. The system of claim 1, wherein the short range wireless communication module of the particular wireless actuator assembly is compatible with Bluetooth.

7. A method of managing a building automation system that includes a plurality of wireless actuator assemblies, each of the plurality of wireless actuator assemblies comprising a short range wireless communication module having a nominal communication range of less than 60 feet, the method comprising:
using a portable handheld device to establish wireless communications with the short range wireless communication module of one or more of the plurality of wireless actuator assemblies;
obtaining a signal strength from each of the one or more of the plurality of wireless actuator assemblies;
determining a relative location of each of the one or more of the plurality of wireless actuator assemblies relative to a current location of the portable handheld device, when at least one of the one or more of the plurality of wireless actuator assemblies are installed at a location that is behind a wall, a ceiling or other physical structure and hidden from view of a user of the portable handheld device, the portable handheld device determining the relative location of each of the one or more wireless actuator assemblies using the signal strength from each of the one or more of the plurality of wireless actuator assemblies;
displaying on a display of the portable handheld device a measure of the obtained signal strength from at least one of the plurality of wireless actuator assemblies to provide an indication to the user of the relative location of the at least one of the plurality of wireless actuator assemblies relative to the location of the portable handheld device;
allowing the user to select a particular one of the at least one of the plurality of wireless actuator assemblies using the portable handheld device; and
displaying a screen on the display of the portable handheld device that enables a user to test and/or troubleshoot the selected wireless actuator assembly.

8. The method of claim 7, further comprising sending an instruction from the portable handheld device to the selected wireless actuator assembly via the short range wireless communication module of the selected wireless actuator assembly instructing the selected wireless actuator assembly to emit an audible signal to provide an audible indication of the location of the selected wireless actuator assembly.

9. The method of claim 7, further comprising initiating a trouble-shooting operation from the displayed screen of the portable handheld device and displaying trouble-shooting results on the display of the portable handheld device.

10. The method of claim 9, further comprising communicating replacement information from the selected wireless actuator assembly to the portable handheld device via the short range wireless communication module of the selected wireless actuator assembly and displaying the replacement information on the display of the portable handheld device if a determination is made that replacement is appropriate.

11. The method of claim 9, further comprising testing operation of the selected wireless actuator assembly from the displayed screen on the portable handheld device, and displaying test results on the display of the portable handheld device.

12. A portable handheld device for use in combination with a plurality of wireless actuator assemblies in a building control system, each of the plurality of wireless actuator assemblies including an actuator configured to actuate an actuated component, a short range wireless communication module and a controller configured to receive commands and transmit information via the short range wireless communication module, the portable handheld device comprising:
a display configured to display information received from one or more of the plurality of wireless actuator assemblies;
the portable handheld device configured to utilize relative signal strength of wireless communication between the portable handheld device and the short range wireless communication module of a particular wireless actuator assembly of the plurality of wireless actuator assemblies to ascertain a relative position of the particular wireless actuator assembly relative to a current position of the portable handheld device, the particular wireless actuator assembly installed at a location that is behind a wall, a ceiling or other physical structure and hidden from view of a user of the portable handheld device;
the portable handheld device configured to display a measure of the relative signal strength that corresponds to the particular wireless actuator assembly;
the portable handheld device configured to enable a user to select the particular wireless actuator assembly; and
wherein in response to the user selecting the particular wireless actuator assembly, the portable handheld device is configured to display on the display of the portable handheld device one or more screens enabling the user to test and/or troubleshoot the particular wireless actuator assembly.

13. The portable handheld device of claim 12, wherein the portable handheld device is configured to send an instruction to the particular wireless actuator assembly, instructing the particular wireless actuator assembly to emit an audible signal to provide an audible indication of the location of the particular wireless actuator assembly.

14. The portable handheld device of claim 12, wherein the portable handheld device is configured to superimpose error messages received from the particular wireless actuator assembly onto one or more of the displayed trouble shooting and/or test screens.

15. The portable handheld device of claim 12, wherein the portable handheld device is configured to:
display one or more screens enabling the user to troubleshoot the particular wireless actuator assembly;

communicate one or more troubleshooting commands to the particular wireless actuator assembly; and display on the display of the portable handheld device information pertaining to how the particular wireless actuator assembly responded to the communicated troubleshooting commands.

16. The portable handheld device of claim 12, wherein the portable handheld device is configured to:

display one or more screens enabling the user to test the particular wireless actuator assembly;

communicate one or more test commands to the particular wireless actuator assembly; and display on the display of the portable handheld device information pertaining to how the particular wireless actuator assembly responded to the communicated test commands.

* * * * *